March 5, 1963 E. J. ROSS 3,080,535
TRANSISTORIZED LOW-FREQUENCY MODULATOR SYSTEM
Filed Dec. 23, 1960

INVENTOR.
EDWARD J. ROSS
BY
Brown, Critchlow, Flick & Peckham
ATTORNEYS

United States Patent Office 3,080,535

Patented Mar. 5, 1963

3,080,535

TRANSISTORIZED LOW-FREQUENCY MODULATOR SYSTEM

Edward Joseph Ross, White Oak, McKeesport, Pa., assignor to Mine Safety Appliances Company, a corporation of Pennsylvania Filed Dec. 23, 1960, Ser. No. 77,881
9 Claims. (Cl. 332—29)

This invention relates to a transistorized frequency modulating system for low frequencies, such as 100 kc.

A particular object of the invention is the provision of a system of this type which is simple, with reasonable stability and minimum power consumption.

The use of transistors in all stages results in a device which is very compact yet reliable, and which has instantaneous warm-up. These characteristics make it advantageous for use in a small portable FM transmitter-receiver An important feature resides in the fact that a single battery located in the oscillator section is used to power both the oscillator and the frequency modulator, thus avoiding the necessity for a separate battery for the frequency modulator.

These, and other objects and advantages of the invention will become apparent as the description proceeds.

GENERAL DESCRIPTION

Figure 1:
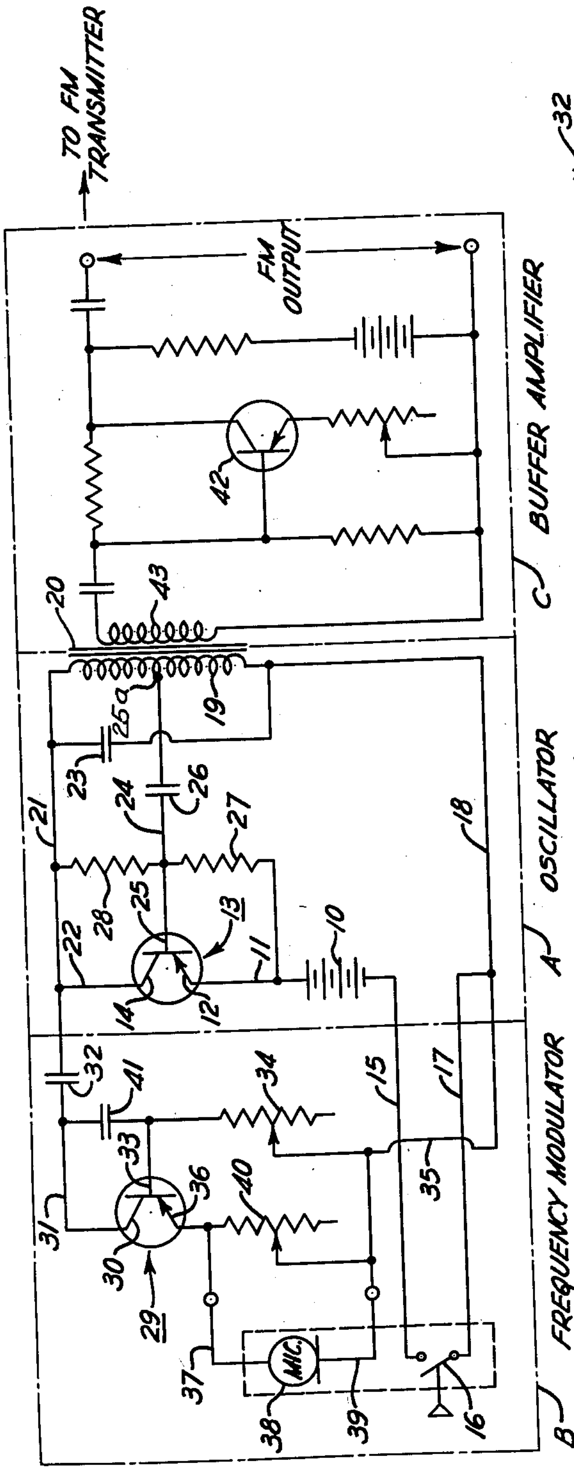
FIG. 1 is a diagram illustrating the electrical components of one form of the invention.

The system includes three stages, an oscilaltor A, a frequency modulator B, and a buffer amplifier C. The output of the buffer amplifier goes to the FM transmitter.

A. *Oscillator*

In the oscillator stage the positive side of battery 10 is connected by conductor 11 to the emitter 12 of the transistor 13.

The negative side of battery 10 is connected to the collector 14 of transistor 13 by the following elements: conductor 15, switch 16, conductor 17, conductor 18, primary winding 19 of transformer 20, conductor 21 and conductor 22.

A condenser 23 is connected across the primary winding 19.

A conductor 24 connects the base 25 of transistor 13 to a mid tap 25*a* of the primary winding 19, and a condenser 26 is inserted in conductor 24.

A resistor 27 is connected in shunt between the emitter 12 and base 25, and a resistor 28 is connected in shunt between the collector 14 and base 25.

It will be clear to those skilled in the art that the circuit including primary winding 19 provides positive feedback to the transistor input, and hence this stage operates as an oscillator.

B. *Frequency Modulator*

The frequency modulator stage includes a transistor 29. The collector 30 of this transistor is connected by conductor 31 and condenser 32 to conductor 21 of the oscillator. Although condenser 32 affects frequency, it is used as a coupler to the frequency modulator.

The base 33 is connected by way of variable resistor 34 and conductor 35 to conductor 18 of the oscillator.

The emitter 36 is connected by conductor 37 to one side of the microphone 38 (preferably of the carbon type). From the opposite side of the microphone a conductor 39 leads to the conductor 35.

A variable resistor 40 is connected in shunt across the microphone.

A condenser 41 is connected in series with the resistor

34 and between the base 33 and collector 30 of transistor 29.

It will be seen that with these circuits there is no D.C. battery power supplied to the modulator. The oscillator voltage is impressed across transistor 29 in series with resistor 40, which will apply reverse and forward bias alternately between the collector 30 and emitter 36.

The sine wave generated at the oscillator is impressed across the transistor 29 at an alternating rate. When the collector 30 is instantaneously negative with respect to the emitter 36, the collector is reverse-biased and the emitter-to-base junction is forward biased. A portion of this instantaneous negative voltage is coupled through capacitor 41 to the base. This will cause the transistor to conduct, altering its impedance accordingly.

When the reverse polarity instantaneously occurs, the collector 30 is forward biased with respect to the emitter 36, while the base-to-emitter PN junction is reverse biased. A small positive voltage is now applied to the base, reversing the transistor's direction of conductivity.

With no change in microphone current the reflected load to the oscillator is constant. With microphone voltage applied, the reflected load is altered in accordance with the microphone voltage.

Condenser 41 and resistor 34 provide a quadrature A.C. voltage to the base 33. This feedback network provides the proper phase shift to inject a capacitive reactance to the oscillator to vary the frequency accordingly.

Resistor 34 affects microphone matching as well as the amount of deviation.

Resistor 40 determines the amount of voltage impressed between emitter and base, and affects the degree of oscillator loading as well as deviation.

The microphone 38 connected across resistor 40 will vary the emitter to base resistance, changing the collector impedance accordingly. This collector impedance in parallel with condenser 41 provides a reactance change to the oscillator which conforms with microphone resistance, thereby varying the oscillator frequency.

In other words, a change in microphone resistance causes a reactance change in the oscillator circuit, with a corresponding change in the frequency of the oscillator.

Figure 2:
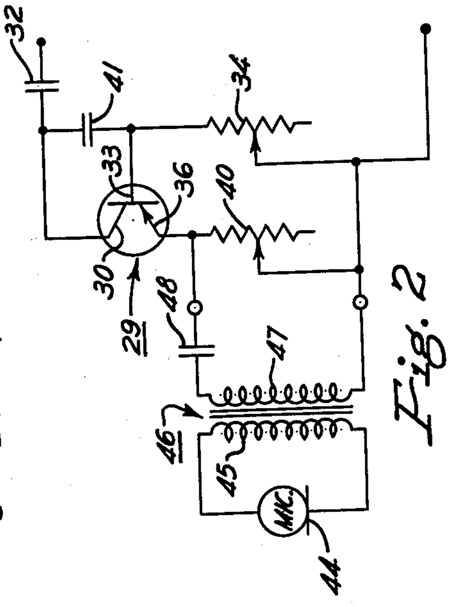
FIG. 2 is a partial diagram illustrating a possible variation.

While a carbon microphone is preferred, it is possible to use a dynamic microphone as shown in FIG. 2. When the operator speaks into the dynamic microphone 44 its moving coil causes an A.C. current to flow through the primary winding 45 of the microphone transformer 46. A coupling capacitor 48 is inserted between secondary winding 47 and the emitter 36. The voltage induced in the secondary winding 47 is applied between the emitter and base of transistor 29, producing the same effect as the carbon microphone.

C. *Buffer Amplifier*

The third section is a buffer amplifier of known type which uses a transistor 42 and related components to amplify the impulses induced in secondary winding 43 of transformer 20.

The output of the buffer amplifier can be fed to the FM transmitter output circuit for further amplification, and can be adapted to any FM transmitter output circuit by changing the oscillator frequency.

OPERATION

The D.C. power for operating both the oscillator A and the frequency modulator B comes from the battery 10 located in the oscillator section.

For convenience in operation the normally-open switch 16, which puts the battery 10 in circuit, is physically mounted on the handpiece which carries the microphone. It is, therefore, easy to depress the button 16 to activate the system whenever the operator desires to talk.

ADVANTAGES

Since all stages of the system are transistorizer, warm-up is instantaneous, and it is not necessary to leave the circuits on during long periods so as to be ready when needed, as with systems using tubes.

The use of transistors also contributes to compactness and reliability, since the transistors are small and can stand severe shocks without injury.

Using the oscillator as a source of A.C. voltage for the frequency modulator also makes for a simple and compact system, and saves the weight of an extra battery.

These features combine to make the system especially suited for a small FM transmitter-receiver used for communication in mines.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A transistorized low-frequeny modulator system which comprises:
   an oscillator circuit comprising a first transistor coupled to an output transformer, a source of electric current connected in the circuit between said transistor and the output transformer, and electrical components providing feedback to the input of said first transistor;
   a modulator circuit comprising a second transistor having an output circuit, said second transistor and output circuit connected across said first transistor and said source of electric current of said oscillator circuit, and means in the output circuit of said second transistor to block current flow from said source of electric current through said second transistor;
   and a microphone circuit including a microphone connected to the modulator circuit and across said second transistor;
   whereby variations produced in the microphone circuit are amplified in the modulator circuit and the resulting modulated current is empressed on the oscillator circuit to modulate the frequency of the output of the oscillator circuit.

2. A device as specified in claim 1 in which the said source of electric current is a battery.

3. A device as specified in claim 2 in which a manual switch controlling the battery current is located at the microphone.

4. A transistorized low-frequency modulator system which comprises:
   (*a*) an oscillator circuit comprising
      a first transistor having a base, an emitter and a collector,
      an output transformer having a primary winding,
      a first electrical circuit including a condenser connecting said collector to said base through a portion of said primary winding, a second electrical circuit including a condenser connecting said emitter to said collector and across said primary winding,
      a resistor connected in shunt between said collector and said base,
      a resistor connected in shunt between said emitter and said base,
      a source of electrical energy in said second electrical circuit,
   (*b*) a modulator circuit comprising a second transistor, said modulator circuit being connected across said oscillator circuit; and
   (*c*) a microphone circuit including a microphone connected to the modulator circuit and across said second transistor;
      whereby variations produced in the microphone circuit are amplified in the modulator circuit and the resulting modulated current is empressed on the oscillator circuit to modulate the frequency of the output of the oscillator circuit.

5. A device as specified in claim 4 in which the output of the oscillator circuit is transmitted through a buffer amplifier to a transmitter.

6. A device as specified in claim 4 in which the said source of electrical energy is a battery.

7. A device as specified in claim 6 in which a manual switch controlling the battery current is located at the microphone.

8. A transistorized low-frequency modulator system as set forth in claim 1 in which said modulator circuit includes a phase shifting network connected across said second transistor and the first transistor and source of electric current of said oscillator circuit.

9. A transistorized low-frequency modulation system having a single source of operating potential comprising:
   an oscillator circuit having a first semi-conductor means, an output transformer, and a source of potential;
   said first semi-conductor means and said source of potential being connected in series across said output transformer;
   second semi-conductor means having an input and an output circuit forming a modulator circuit connected across said first semi-conductor means and said source of potential;
   means connected with said second semi-conductor means for selectively varying the effective reactance of the modulator circuit to thereby modulate the oscillator output frequency by the resulting modulated current impressed thereon from said second semi-conductor means;
   and means connected in said second semi-conductor output circuit for blocking current flow therethrough from said source of potential.

References Cited in the file of this patent

UNITED STATES PATENTS

| | | |
|---|---|---|
| 2,771,584 | Thomas | Nov. 20, 1956 |
| 2,870,421 | Goodrich | Jan. 20, 1959 |
| 2,989,745 | Carroll | June 20, 1961 |